US008661277B2

(12) United States Patent
Tokoro

(10) Patent No.: US 8,661,277 B2
(45) Date of Patent: Feb. 25, 2014

(54) COMMUNICATION APPARATUS AND METHOD OF CONTROLLING THE SAME

(75) Inventor: Takashi Tokoro, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 13/033,748

(22) Filed: Feb. 24, 2011

(65) Prior Publication Data

US 2011/0239022 A1    Sep. 29, 2011

(30) Foreign Application Priority Data

Mar. 24, 2010    (JP) ................................. 2010-068915

(51) Int. Cl.
*G06F 1/00* (2006.01)
*G06F 1/26* (2006.01)
*G09G 1/06* (2006.01)
*G09G 3/04* (2006.01)
*H04N 9/64* (2006.01)
*G06F 13/42* (2006.01)
*G06F 3/00* (2006.01)

(52) U.S. Cl.
USPC ............... 713/323; 713/320; 345/10; 345/33; 348/720; 710/105; 710/305; 719/322

(58) Field of Classification Search
USPC ........... 713/320, 323; 709/105, 305; 719/322; 345/10, 33; 348/720; 710/105, 305
See application file for complete search history.

(56) References Cited

U.S. PATENT DOCUMENTS

| 7,975,088 B2* | 7/2011 | Yoshida et al. ............... 710/302 |
| 8,332,674 B2* | 12/2012 | Kim ............................. 713/320 |
| 2008/0129883 A1* | 6/2008 | Hirai et al. ...................... 348/730 |
| 2009/0237561 A1* | 9/2009 | Kobayashi ...................... 348/554 |
| 2010/0083327 A1 | 4/2010 | Toba et al. ...................... 725/109 |
| 2011/0084685 A1* | 4/2011 | Zhong et al. ............... 324/76.11 |
| 2011/0096793 A1* | 4/2011 | Bar-Niv et al. ............... 370/463 |

FOREIGN PATENT DOCUMENTS

| CN | 101561792 A | 10/2009 |
| JP | 2000-309142 A | 11/2000 |
| JP | 2003-087296 A | 3/2003 |
| JP | 2004-98532 A | 4/2004 |
| JP | 2009-088956 A | 4/2009 |
| JP | 2010-087894 A | 4/2010 |
| WO | 2010001586 A1 | 1/2010 |

OTHER PUBLICATIONS

"High-Definition Multimedia Interface Specification Version 1.4a", HDMI Licensing, LLC, Mar. 4, 2010.
The State Intellectual Property Office of People's Republic of China, Office Action dated Dec. 5, 2012, in connection with Application No. 201110074816.5 (5 pages).

* cited by examiner

*Primary Examiner* — Stefan Stoynov
(74) *Attorney, Agent, or Firm* — Fitzpatrick, Cella, Harper & Scinto

(57) ABSTRACT

There is provided a communication apparatus including an HDMI connector complying with HEC (HDMI Ethernet Channel)-compliant HDMI standards, comprising: an HEC communication unit configured to communicate, via HEC, with an HEC-compliant communication apparatus connected to the HDMI connector; a determination unit configured to determine, using a protocol of the HDMI standards, whether or not an HEC-compliant communication apparatus is connected to the HDMI connector; and a control unit configured to stop power supply to the HEC communication unit if it is determined that an HEC-compliant communication apparatus is not connected to the HDMI connector.

3 Claims, 5 Drawing Sheets

FIG. 3

|  | Physical Address | COMPLIANCE WITH Ethernet | Physical Address | COMPLIANCE WITH Ethernet | Physical Address | COMPLIANCE WITH Ethernet |
|---|---|---|---|---|---|---|
| HDMI1 | 1.0.0.0 | COMPLIANT | 1.1.0.0 | IN COMPLIANT | 1.1.2.0 | IN COMPLIANT |
| HDMI2 | 2.0.0.0 | IN COMPLIANT | 2.3.0.0 | COMPLIANT | — | — |

301

|  | Physical Address | COMPLIANCE WITH Ethernet | Physical Address | COMPLIANCE WITH Ethernet | Physical Address | COMPLIANCE WITH Ethernet |
|---|---|---|---|---|---|---|
| HDMI1 | 1.0.0.0 | IN COMPLIANT | 1.1.0.0 | IN COMPLIANT | 1.1.2.0 | IN COMPLIANT |
| HDMI2 | 2.0.0.0 | IN COMPLIANT | 2.3.0.0 | COMPLIANT | — | — |

302

ND METHOD OF CONTROLLING THE SAME

COMMUNICATION APPARATUS AND METHOD OF CONTROLLING THE SAME

BACKGROUND OF THE INVENTION

1. Field of the Invention

The present invention relates to a communication apparatus and a method of controlling the same.

2. Description of the Related Art

Establishment of the HDMI 1.4 (High-Definition Multimedia Interface Specification Version 1.4) standards enables to communicate Ethernet data via one HDMI cable in addition to video data and audio data. According to the HDMI 1.4, video data and audio data are transmitted from a source device to a sink device using a TMDS (Transition Minimized Differential Signaling) line. As for Ethernet data, two-way communication is performed between a source device and a sink device using an existing HPD (Hot Plug Detect) line and a Utility line that is conventionally Reserved. This allows communication of Ethernet data between HDMI devices without using an Ethernet cable and therefore facilitates network building. An HDMI device joining a network needs to relay Ethernet data between other devices connected to itself.

In general, an HDMI device can transit to a standby state to reduce power consumption in an idle state. In the standby state, power supply to most circuits of the HDMI device stops to reduce power consumption. However, power supply to some circuits (for example, a circuit that receives a signal from a remote controller) continues. In particular, an HDMI device joining a network needs to relay Ethernet data between other devices, as described above, and therefore needs to continuously supply power to the routing circuit (Ethernet switch) even in the standby state. This causes an increase in the power consumption of the HDMI device.

Meanwhile, the other devices connected to the HDMI device joining the network do not necessarily support Ethernet data communication. For example, an HDD recorder connected to a digital television (DTV) complying with HDMI 1.4 may support only HDMI 1.3a but not Ethernet data communication. In this case, even when the DTV continuously supplies power to the Ethernet switch in the standby state, the Ethernet switch is not used at all, and the power is wasted. Even in a state other than standby, power is wastefully supplied to the Ethernet communication unit for an HDMI connector connected to an HEC-incompliant HDMI recorder.

For example, Japanese Patent Laid-Open No. 2003-87296 is conventionally known as a technique of reducing the standby power consumption of a network device. A network device according to the prior art determines by monitoring a link pulse or the presence/absence of traffic whether an external communication device is connected. If no device is connected, the network device transits to a power saving mode (a state in which only the connection presence/absence detection unit is ON).

However, when the prior art is applied to an HEC-compliant HDMI device (communication apparatus), power may be supplied to the Ethernet switch even if an HDMI device connected to the HDMI connector is HEC-incompliant. This impairs efficient control according to the HDMI standards.

SUMMARY OF THE INVENTION

The present invention has been made in consideration of the above-described situation, and provides a technique of suppressing wasteful power consumption of a communication apparatus complying with the HEC-compliant HDMI standards.

According to an aspect of the present invention, there is provided a communication apparatus including an HDMI connector complying with HEC (HDMI Ethernet Channel)-compliant HDMI standards, comprising: an HEC communication unit configured to communicate, via HEC, with an HEC-compliant communication apparatus connected to the HDMI connector; a determination unit configured to determine, using a protocol of the HDMI standards, whether or not an HEC-compliant communication apparatus is connected to the HDMI connector; and a control unit configured to stop power supply to the HEC communication unit if it is determined that an HEC-compliant communication apparatus is not connected to the HDMI connector.

According to another aspect of the present invention, there is provided a method of controlling a communication apparatus including an HDMI connector complying with HEC (HDMI Ethernet Channel)-compliant HDMI standards, the communication apparatus including an HEC communication unit configured to communicate, via HEC, with an HEC-compliant communication apparatus connected to the HDMI connector, the method comprising: a determination step of determining, using a protocol of the HDMI standards, whether or not an HEC-compliant communication apparatus is connected to the HDMI connector; and a control step of stopping power supply to the HEC communication unit if it is determined that an HEC-compliant communication apparatus is not connected to the HDMI connector.

According to the present invention with the above-described arrangement, it is possible to suppress wasteful power consumption of a communication apparatus complying with the HEC-compliant HDMI standards.

Further features of the present invention will become apparent from the following description of exemplary embodiments with reference to the attached drawings.

BRIEF DESCRIPTION OF THE DRAWINGS

FIG. 3 is a view showing two examples of a connected device management table;

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

First Embodiment

Figure 1:
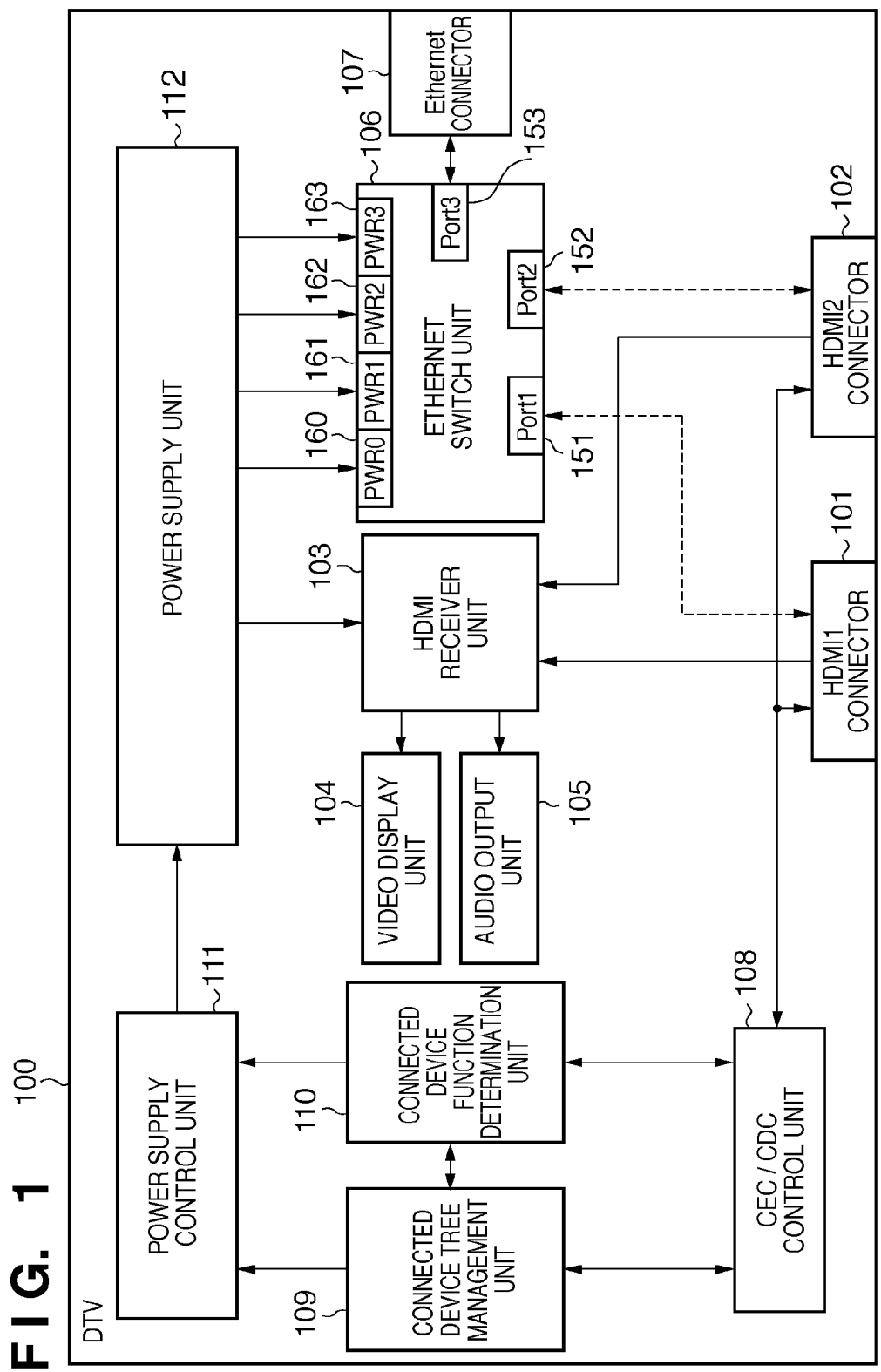
FIG. 1 is a block diagram showing the schematic arrangement of a DTV 100 according to the first embodiment.

An embodiment will now be explained in which a communication apparatus according to the present invention is applied to a digital television (DTV). FIG. 1 is a block diagram showing the schematic arrangement of a DTV 100 according to the first embodiment. The DTV 100 can transit to a standby state. In the standby state, although power supply to most units of the DTV 100 stops, that to some units (for example, an Ethernet switch unit 106 to be described later) continues.

In the standby state, the power consumption of the Ethernet switch unit 106 becomes larger in relation to that of the entire DTV 100. Hence, this embodiment will be described with focus placed on power supply control to the Ethernet switch unit 106 in the standby state of the DTV 100. However, power supply control according to this embodiment is effective even if the DTV 100 is not in the standby state unless it is specifically stated otherwise.

In this embodiment, the DTV 100 includes two HDMI connectors complying with the HEC (HDMI Ethernet Channel)-compliant HDMI standards, and one Ethernet connector, as will be described later. However, power supply control according to this embodiment is effective even if the DTV 100 has only one HDMI connector unless it is specifically stated otherwise.

Referring to FIG. 1, the DTV 100 includes HDMI connectors 101 and 102, HDMI receiver unit 103, video display unit 104, audio output unit 105, Ethernet switch unit 106, and Ethernet connector 107. The DTV 100 also includes a CEC/CDC control unit 108, connected device tree management unit 109, connected device function determination unit 110, power supply control unit 111, and power supply unit 112. Note that CDC stands for Capability Discovery and Control.

The HDMI connectors 101 and 102 receive a video signal and audio signal from an HDMI device connected via an HDMI cable, and output them to the HDMI receiver unit 103. The HDMI connectors 101 and 102 also transmit/receive a CEC/CDC control signal to/from the CEC/CDC control unit 108. The HDMI connectors 101 and 102 are HEC-compliant connectors complying with, for example, HDMI 1.4, and transmit/receive an Ethernet signal to/from the Ethernet switch unit 106. The Ethernet connector 107 receives an Ethernet packet for a home network or the Internet other than the HDMI-connected devices.

The HDMI receiver unit 103 performs predetermined decoding processing for the input video signal and audio signal so as to separate the video signal and the audio signal, and outputs them to the video display unit 104 and the audio output unit 105, respectively. The video display unit 104 displays the input video signal. The audio output unit 105 outputs the input audio signal.

The Ethernet switch unit 106 includes ports 151, 152, and 153. The port 151 functions as an HEC communication unit to communicate, via HEC, with an HEC-compliant HDMI device (HEC-compliant communication apparatus) connected to the HDMI connector 101. The port 152 also functions as an HEC communication unit to communicate, via HEC, with an HEC-compliant communication apparatus connected to the HDMI connector 102. The port 153 functions as an Ethernet communication unit to communicate, in accordance with the Ethernet standards, with another communication apparatus (for example, the gateway of a home network) connected to the Ethernet connector 107. The Ethernet switch unit 106 functions as a routing unit to route Ethernet packets from the devices connected to the HDMI connectors 101 and 102 and the Ethernet connector 107 and transmit each packet to the port to which the destination device is connected. The Ethernet switch unit 106 also includes power receiving units 160 to 163 which receive power supply from the power supply unit 112. The power receiving unit 160 receives power supply for the Ethernet switch unit 106 serving as the routing unit. The power receiving units 161 to 163 receive power supply for the ports 151 to 153, respectively.

The CEC/CDC control unit 108 transmits/receives a CEC command to/from a connected device (HDMI device), thereby acquiring data to be used to determine an HDMI connector (HDMI connector 101 or 102) to which the HDMI device is connected. The CEC/CDC control unit 108 outputs the acquired data (connected device determination data) to the connected device tree management unit 109. The CEC/CDC control unit 108 also transmits/receives a CDC command to/from a connected device, thereby acquiring data to be used to determine whether the connected device supports the Ethernet function (HEC). The CEC/CDC control unit 108 outputs the acquired data (Ethernet function presence/absence determination data) to the connected device function determination unit 110.

When the DTV 100 has transited to the sleep mode (standby state), the connected device tree management unit 109 outputs, to the CEC/CDC control unit 108, a command to confirm the number of HDMI devices connected to the DTV 100 and HDMI connectors to which these HDMI devices are connected. The connected device tree management unit 109 acquires the above-described connected device determination data from the CEC/CDC control unit 108, and stores a list of connected devices as a connected device tree.

The connected device function determination unit 110 outputs, to the CEC/CDC control unit 108, an Ethernet function presence/absence confirmation command for each connected device stored by the connected device tree management unit 109. The connected device function determination unit 110 acquires the above-described Ethernet function presence/absence determination data from the CEC/CDC control unit 108, and stores the Ethernet function presence/absence of each connected device.

Based on the connected device information stored by the connected device tree management unit 109 and the Ethernet function presence/absence information stored by the connected device function determination unit 110, the power supply control unit 111 determines ports of the Ethernet switch unit 106 to be energized and notifies the power supply unit 112 of the determination result (power supply control information).

The power supply unit 112 supplies power to the entire DTV 100. The power supply unit 112 also on/off-controls power supply (executes and stops power supply) to the Ethernet switch unit 106 on the port basis (for each of ports 151 to 153) in accordance with the power supply control information input from the power supply control unit 111. The power supply unit 112 also on/off-controls power supply to the Ethernet switch unit 106 serving as the routing unit.

Figure 2:
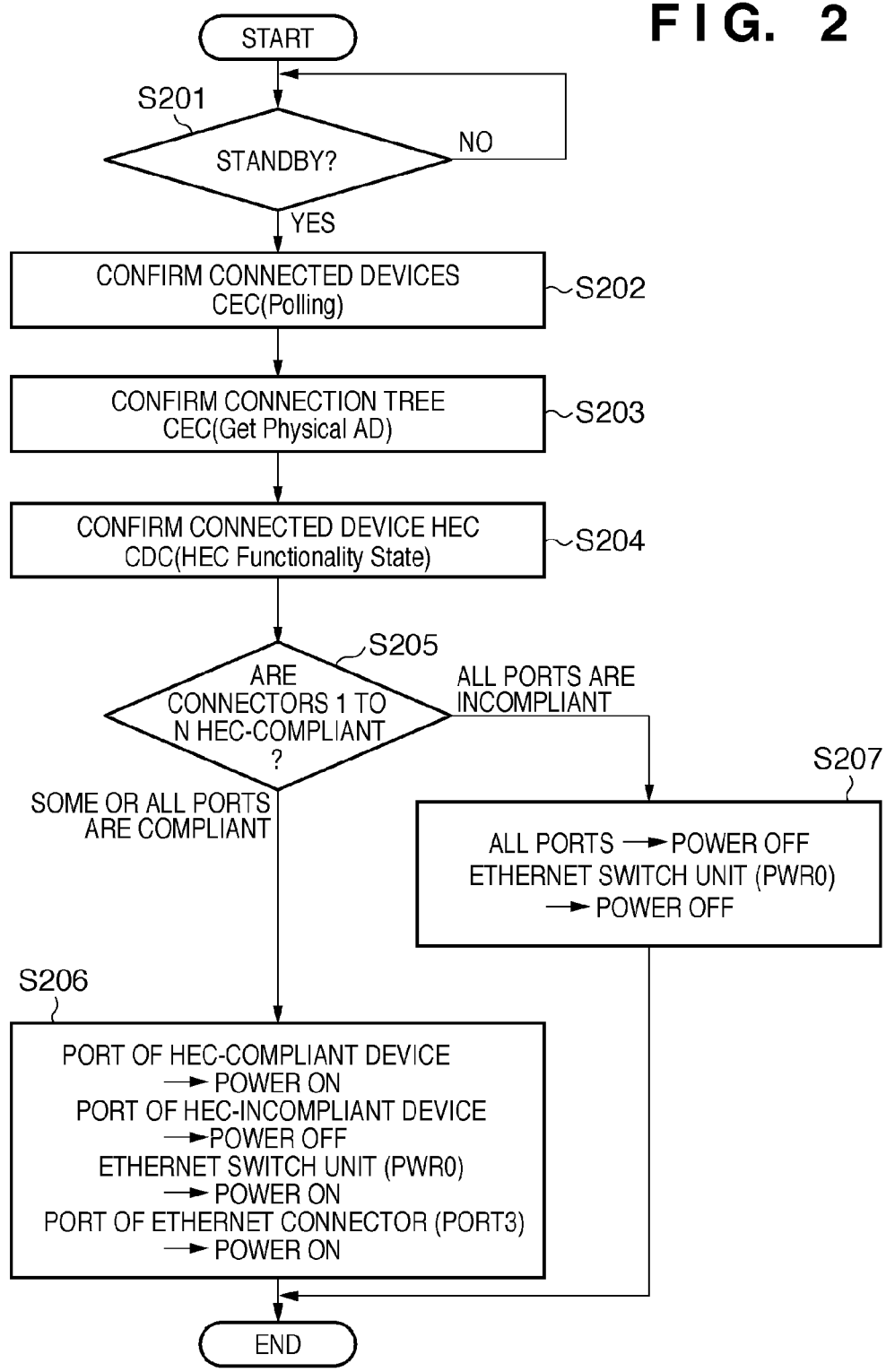
FIG. 2 is a flowchart illustrating power supply control according to the first embodiment.

FIG. 2 is a flowchart illustrating power supply control according to the first embodiment. In step S201, the power supply control unit 111 determines whether the DTV 100 is in the standby state. For example, upon receiving a standby instruction from the user via a remote controller (not shown), the DTV 100 transits to the standby state. If the DTV 100 is in the standby state, the process advances to step S202. Otherwise, the process of step S201 is repeated. However, since power supply control according to this embodiment is effective even if the DTV 100 is not in the standby state, as described above, the process of step S201 may be omitted.

In step S202, the connected device tree management unit 109 transmits, via the CEC/CDC control unit 108, a CEC command (Polling) to the devices connected to the HDMI connectors 101 and 102. The connected device tree management unit 109 acquires the Logical Address of each connected device from the response to the CEC command, and stores it.

In step S203, the connected device tree management unit 109 transmits, via the CEC/CDC control unit 108, a CEC command (Get Physical Address) to the connected devices having the Logical Addresses stored in step S202. The connected device tree management unit 109 acquires the Physical Address of each connected device from the response to the CEC command. The connected device tree management unit 109 generates the connection tree of the DTV 100 and connected devices based on the acquired Physical Addresses and stores it as a device management table. The device management table will be described later.

In step S204, the connected device function determination unit 110 determines using the protocol of the HDMI standards whether HEC-compliant HDMI devices are connected to the HDMI connectors 101 and 102. More specifically, the connected device function determination unit 110 acquires the connected device management table from the connected device tree management unit 109 and transmits a CDC command (HEC Functionality State) to each connected device via the CEC/CDC control unit 108. The connected device function determination unit 110 determines based on the response to the CDC command whether each connected device supports the Ethernet function (HEC) and stores the result in the connected device management table of the connected device tree management unit 109.

The connected device management table will be described here with reference to FIG. 3. An HDMI device whose Physical Address (A.B.C.D) acquired in step S203 has a value of 1, for A is connected to the HDMI connector 101. An HDMI device having a value of 2, for A is connected to the HDMI connector 102. Which stage of each HDMI connector is connected to the device can also be determined based on the values of B, C, and D.

An HDMI device whose HEC Functionality State acquired in step S204 is Enable is HEC-compliant. An HDMI device whose HEC Functionality State is Disable is HEC-incompliant. An HDMI device which returns no response to the CDC command (HEC Functionality State) is also determined as HEC-incompliant.

Referring to FIG. 3, a connected device management table 301 shows a state in which devices are connected to the first to third stages of the HDMI connector 101, and devices are connected to the first and second stages of the HDMI connector 102. The connected device management table 301 also shows a state in which the device having Physical Address 1.0.0.0 (one of the devices directly connected to the DTV 100) supports Ethernet (HEC-compliant). The connected device management table 301 also shows a state in which the device having Physical Address 2.0.0.0 (another device directly connected to the DTV 100) does not support Ethernet (HEC-incompliant).

A connected device management table 302 shows a state in which devices are connected to the first to third stages of the HDMI connector 101, and devices are connected to the first and second stages of the HDMI connector 102, like the connected device management table 301. The connected device management table 302 also shows a state in which the devices having Physical Addresses 1.0.0.0 and 2.0.0.0 (all the devices directly connected to the DTV 100) do not support Ethernet.

Referring back to FIG. 2, the power supply control unit 111 acquires the connected device management table from the connected device tree management unit 109 in step S205. The power supply control unit 111 determines whether the devices directly connected to the DTV 100 (devices whose Physical Addresses have 0 for the second and subsequent digits) are HEC-compliant. If at least one device is HEC-compliant, the process advances to step S206. If all devices are HEC-incompliant, the process advances to step S207.

Note that an HDMI connector to which no device is connected is handled like a connector connected to an HEC-incompliant device.

In step S206, the power supply unit 112 stops power supply to the ports corresponding to the HDMI connectors to which the HEC-incompliant devices are connected (including HDMI connectors to which no device is connected). On the other hand, the power supply unit 112 continues power supply to the Ethernet switch unit 106 serving as the routing unit and the remaining ports. Hence, power supply to, of the plurality of ports, only ports corresponding to the HDMI connectors to which an HEC-compliant HDMI device is not connected stops. In the example of the connected device management table 301, the power supply unit 112 continues power supply to the power receiving units 160, 161, and 163 but stops power supply to the power receiving unit 162 (HEC communication unit for the HDMI connector 102).

In step S207, the power supply unit 112 stops power supply to all ports (ports 151 to 153) of the Ethernet switch unit 106. The power supply unit 112 stops power supply to the Ethernet switch unit 106 serving as the routing unit as well. For, for example, the connected device management table 302, the process of step S207 is executed. However, when step S201 is omitted, as described above, the power supply control unit 111 may determine in step S207 whether the DTV 100 is in the standby state. If the DTV 100 is not in the standby state, the power supply unit 112 may continue power supply to the power receiving units 160 and 163. This allows the DTV 100 itself to continue joining the home network via the Ethernet connector 107 even when an HEC-compliant HDMI device is not connected to the HDMI connector.

Note that in the above description, a connection tree of connected devices is generated, and a device management table as shown in FIG. 3 is stored. However, generating a connection tree of connected devices is not essential in the present invention. It may be determined only for devices directly connected to the DTV 100 (the connected devices of the first stage) whether they support the Ethernet function (HEC).

As described above, according to this embodiment, in the Ethernet switch unit 106, power supply to ports (HEC communication units) for HDMI connectors to which HEC-compliant communication devices are not connected stops. Hence, wasteful power consumption of the DTV 100 is suppressed.

Second Embodiment

Figure 4:
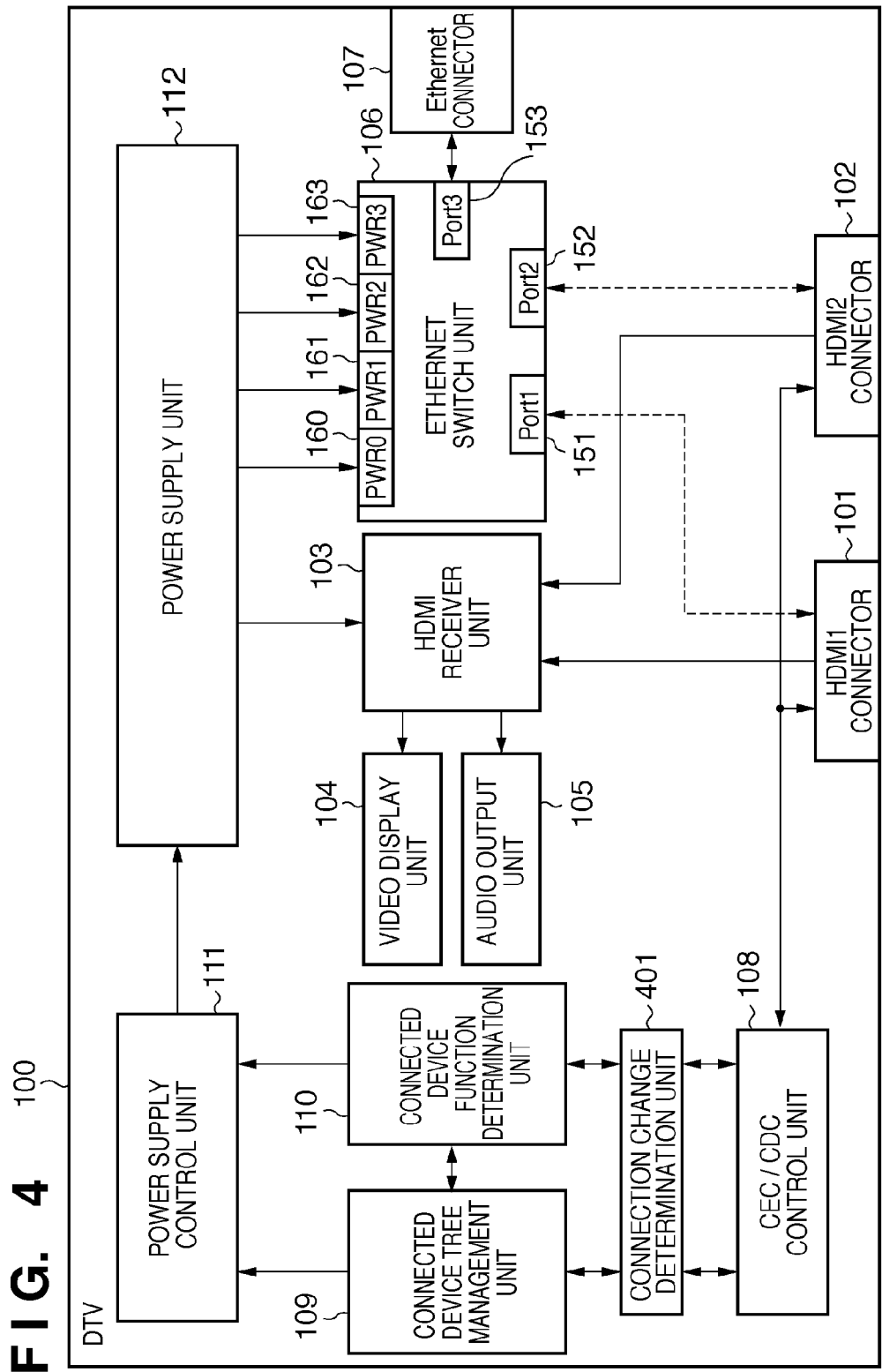
FIG. 4 is a block diagram showing the schematic arrangement of a DTV 100 according to the second embodiment.

In the second embodiment, a technique of handling the change of an HDMI device connected to an HDMI connector 101 or 102 will be described. FIG. 4 is a block diagram showing the schematic arrangement of a DTV 100 according to the second embodiment. The same reference numerals as in FIG. 1 denote blocks having the same or similar functions in FIG. 4, and a description thereof will be omitted.

A connection change determination unit 401 periodically instructs a connected device tree management unit 109 to transmit a CEC command (Polling) and a CEC command (Get Physical Address). The connection change determination unit 401 also periodically instructs a connected device function determination unit 110 to transmit a CDC command (HEC Functionality State). The connection change determination unit 401 determines whether the connected device table stored by the connected device tree management unit 109 has changed.

Figure 5:
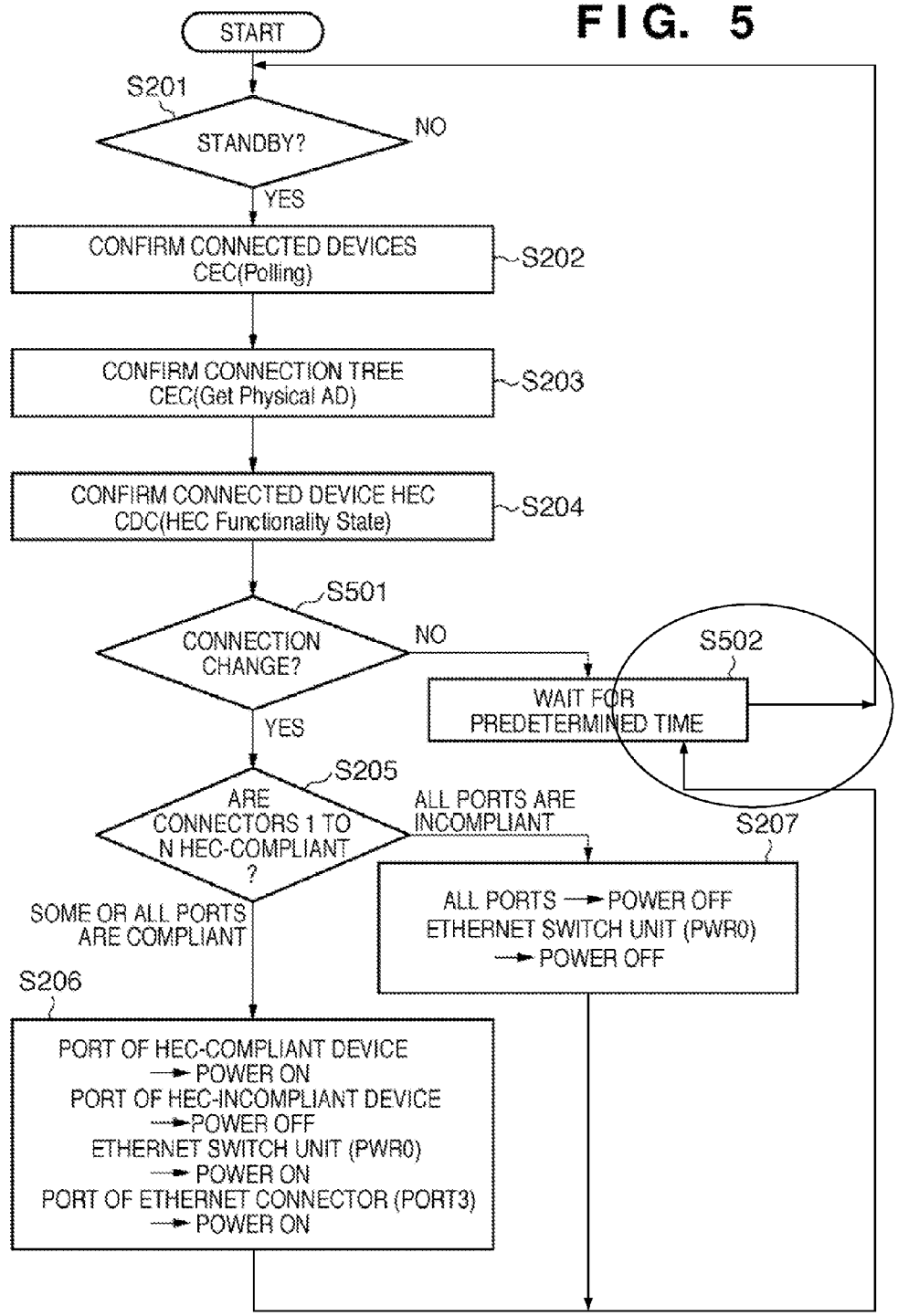
FIG. 5 is a flowchart illustrating power supply control according to the second embodiment.

FIG. 5 is a flowchart illustrating power supply control according to the second embodiment. The same step numbers as in FIG. 2 denote steps of the same or similar processes in FIG. 5, and a description thereof will be omitted. In step S501, the connection change determination unit 401 determines whether a change has occurred in the connected device table stored by the connected device tree management unit 109. If a change has occurred (including initial generation of a connected device table), the process advances to step S205. Otherwise, the process advances to step S502. In step S502, the process waits for a predetermined time and then returns to step S201. After the process of step S206 or S207, the process of the flowchart advances to step S502. After the process of step S502, the processes of steps S202 to S204 are executed again. Hence, the CEC commands and CDC command are periodically transmitted.

The above-described processing enables, when, for example, the user has exchanged the HDMI device connected to the HDMI connector 101 or 102 with another HDMI device, power supply control according to the HDMI device after the exchange.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-068915, filed on Mar. 24, 2010, which is hereby incorporated by reference herein in its entirety.

What is claimed is:

1. A communication apparatus, comprising:
   an HDMI (High-Definition Multimedia Interface) connector complying with HEC (HDMI Ethernet Channel)-compliant HDMI standards;
   an HEC communication unit that communicates, based on HEC, with an HEC-compliant communication apparatus connected to the HDMI connector;
   an HDMI communication unit that communicates, using a protocol of the HDMI standards, with an HEC-compliant communication apparatus connected to the HDMI connector;
   a determination unit that determines, using a CDC (Capability Discovery and Control) command, whether or not an external apparatus, connected to the HDMI connector, is an HEC-compliant communication apparatus; and
   a control unit that controls power supply to the HEC communication unit in accordance with a determination result by the determination unit.

2. The communication apparatus according to claim 1, wherein the control unit stops power supply to the HEC communication unit if the determination unit determines that an external apparatus, connected to the HDMI connector, is not an HEC-compliant communication apparatus.

3. A method of controlling a communication apparatus, wherein the communication apparatus includes an HDMI (High-Definition Multimedia Interface) connector complying with HEC (HDMI Ethernet Channel)-compliant HDMI standards, an HEC communication unit that communicates, based on HEC, with an HEC-compliant communication apparatus connected to the HDMI connector, and an HDMI communication unit that communicates, using a protocol of the HDMI standards, with an HEC-compliant communication apparatus connected to the HDMI connector, the method comprising:
   a determination step of determining, using a CDC (Capability Discovery and Control) command, whether or not an external apparatus, connected to the HDMI connector, is an HEC-compliant communication apparatus, and
   a step of controlling power supply to the HEC communication unit in accordance with a determination result by the determination step.

* * * * *